3,069,400
COPOLYMERS OF VINYL CHLORIDE WITH PHOSPHITE ESTERS

Benjamin D. Halpern, Jenkintown, Pa., assignor to The Borden Company, New York, N.Y., a corporation of New Jersey
No Drawing. Filed May 13, 1959, Ser. No. 812,801
3 Claims. (Cl. 260—87.5)

This invention relates to the stabilization of chlorine-containing resins.

Polymers and copolymers of vinyl chloride, vinylidene chloride, and like halogen-containing monomers are subject to decomposition under the influence of light or heat and, for that reason, are usually mixed with a stabilizer. In such mixtures, the stabilizers may be lost or reduced below the effective concentration, as by migration, leaching, or volatilization.

The present invention provides a process and product in which the stabilizer is fixed by the vinyl chloride or like monomer used. As a result, the stabilizer is particularly effective, no longer migratory, and not subject to separation from the polymeric material by volatilization or extraction under conditions that would otherwise make such separation possible.

Briefly stated, the invention comprises the process and product of copolymerizing an ethylenic bond polymerizable, chlorine-containing monomer with a stabilizer copolymerizable therewith. In the embodiment of the invention now considered most important, the stabilizer includes a metal used in the form of an ester (sometimes considered a salt) of an ethylenic bond polymerizable aliphatic acid, the metal being known to have some stabilizing action when mixed in mechanically with chlorine-containing polymers. In another embodiment, the stabilizer is an alkenyl phosphite.

Materials

As the monomer to be copolymerized with the stabilizer, there is used any ethylenic bond polymerizable, chlorine-containing monomer that is subject to stabilization to some degree at least with compounds of those metals listed herein. Examples of such monomers that I use are vinyl chloride and mixtures thereof with vinyl formate, acetate, propionate, and butyrate or with a $C_1$–$C_{18}$ alkyl acrylate or methacrylate; vinyl chloride-vinyl acetate-maleic anhydride mixtures and vinyl chloride-vinyl acetate-vinyl alcohol mixtures, the vinyl chloride content being 65%–95% of the weight of each of said mixtures; vinylidene chloride; and chlorinated acrylic and methacrylic acids, $C_1$–$C_4$ alkyl esters of the said chlorinated acids, and chloroalkyl esters of acrylic and methacrylic acids.

The copolymerizable stabilizer is one that contains a double bond on a beta carbon and that, for best results under all conditions, is soluble in the monomer with which the stabilizer is to be copolymerized, i.e., soluble as a whole or in the form of the copolymerizable part of the stabilizer into which the metal may be introduced later.

The metal component of the stabilizer is any metal known to be effective in stabilizing polyvinyl chloride. Examples are lead, cadmium, stannous or stannic tin, barium, calcium, strontium, and zinc. These metals as used are associated, in the form of salts with groups that are ethylenic bond polymerizable, as for example with the anions of acrylic, methacrylic, crotonic, itaconic, vinylacetic, angelic, tiglic, maleic, and fumaric acids and mono-chloro substitution products of the said acids. In the case of those of these acids that are polybasic, the metal may be in the form of a partial ester (salt) such as a half ester, although I ordinarily use the complete ester in which the metal is equivalent in amount to the anion, so as to obtain a maximum proportion of the metal for unit weight of the whole compound.

I obtain particularly satisfactory results when the metals are used in the form of the alkyl metal esters. When the metal is bivalent, only one alkyl group may be represented in the product, the ester then being of the general formula: R—M—Ac, R standing for an alkyl, M an atom of the metal, and Ac for one equivalent of the selected unsaturated acid. For a metal of valence greater than 2, the general formula, illustrated by the case of stannic tin, is as follows: $R_x$—M—$Ac_{4-x}$, $x$ in this formula representing the number of alkyl radicals in the molecule and varying from 1–3.

The alkyl group R may be any alkyl containing 1–18 carbon atoms or moderately more. The larger the alkyl group, the greater is the dilution of the metal content of the stabilizer. As a result, I ordinarily use an alkyl or alkyls, each containing 1–4 carbon atoms. Larger alkyls may be used, however, to increase the proportion of organic component to metal and thus increase the solubility in the said monomers.

In general, the ethylenic bond polymerizable acid represented in the said anion is one containing double bond unsaturation of a carbon in the position beta with respect to the carboxyl group. While this double bond may extend between the beta and the gamma carbons, as in vinyl acetic acid, it is ordinarily between the alpha and the beta carbons, as in acrylic acids. The alpha-beta unsaturation increases the facility of copolymerization with the said monomers such as vinyl chloride and is the preferred position for the ethylenic bond.

Examples of the stabilizers that illustrate the class to be used are the salts of mono-, di-, or tri-$C_{1-18}$ alkyl compounds of any of the metals herein, e.g. trimethyl or tributyl tin ester of acrylic or any of the beta carbon unsaturated acids listed above.

For some purposes, stabilizers containing no metal component may be copolymerized with the chlorine-containing monomer. Examples of such other stabilizers to be used and copolymerized are phosphite esters containing at least one ethylenically unsaturated beta carbon atom and having $C_1$–$C_8$ alkyl or aryl group in number required, if any, to make 3 hydrocarbon radicals forming a complete ester with the acid. Examples are the phosphite esters of vinyl, allyl, or cinnamyl alcohol, i.e. having 1–3 of any of the following unsaturated groups, in ester relation, namely vinyl, allyl, or cinnamyl, and also ethyl, butyl, octyl, phenyl, cresyl, or xylyl radicals in number, if any, required to make the total of all esterified radicals 3 for each phosphite group. Other examples are the $C_1$–$C_{18}$ alkyl acrylates and methacrylates such as those in which the alkyl groups are methyl, ethyl, butyl, ethylhexyl, or stearyl.

The beta carbon unsaturated esters of this type are copolymerized with the halogen-containing monomer.

The stabilizer must be in contact with the chlorine-containing monomer at the time of the copolymerization and when the initiator or catalyst is active.

Accessory materials for the copolymerization of the monomers and the stabilizers are used of kinds, in proportions, and under conditions that are conventional for ethylenic bond polymerization.

Initiators of ethylenic bond polymerization that are used include inorganic per compounds such as sodium perborate or peroxide, hydrogen peroxide, and ammonium or potassium persulfates; organic peroxides such as benzoyl peroxide, lauroyl peroxide, and dichlorobenzoyl peroxide; any conventional azo initiator such as alpha, alpha'-azodiisobutyronitrile; and peracetic and like peracids and esters thereof. The alkali metal persulfate initiators give particularly good results as to suspension stability during polymerization and clarity and heat stability of the product. The amount of the initiator (catalyst) used is 0.001%–5% and ordinarily 0.01%–0.5% of the weight of the chlorine-containing monomer.

With the initiator there may be used a reducing agent such as any alkali metal bisulfite or metabisulfite, thiosulfate, or formaldehyde-sulfoxylate, in about equal proportion with the initiator, to form a "redox" catalyst.

Activators, such as ferrous sulfate, silver nitrate, copper sulfate, ferrous ammonium sulfate, or titanous sulfate may be added, as to the extent of 5–2000 parts per million of water present.

To control pH, alkali buffers, as, for example, sodium or potassium acetate, phosphate, or borate are added.

To adjust the molecular weight and still maintain heat stability, a chain transfer agent is sometimes added, particularly when carrying out suspension polymerizations using peroxide catalysts. From 0.01%–20% may be used on the weight of the said monomer, ordinarily 0.5%–2%. Examples are di- or trichloroethylene and durene (1,2,4,5-tetramethyl benzene).

*Proportion of Stabilizer and Water*

The proportion of the copolymerizable stabilizer will vary in accordance with the particular metal represented therein. It will be smaller when the stabilizer is known to be effective in trace proportion than with those metals requiring larger amounts in the usual mechanical mixtures of metal stabilizers with chlorine-containing polymers. Thus, I use 0.001%–60% of the stabilizer, and for most purposes, 0.3%–5% of the stabilizer on the weight of the said monomer. The very large amounts such as above 5% and up to 60% are used only when the compound is to be employed for a purpose in which the functional component is the metal alone. I use a very large amount of the metal, for instance, when making a fungicide of a fungicidal metal.

When water is required in the polymerization by the technique selected, the proportion may be 100–1000 or more parts of the water for 100 parts of the monomer such as vinyl chloride. In the emulsion or suspension polymerization, the monomer:water ratio is suitably 1–5 parts of the monomer for 1–5 also of water and ordinarily 1 part of the monomer for 2–4 of water.

*Conditions of Copolymerization*

The temperature of the copolymerization is approximately 20°–120° C. and normally 55°–70°. At temperatures below 20° the polymerization is too slow to be commercially satisfactory. Above 120° C., difficulties arise in control of the polymerization and also in retention of some of the monomers such as vinyl chloride in liquid form at reasonable pressures.

The pressure used is ordinarily within the range that is autogenous, as from atmospheric up to 150 p.s.i.

The pH is established above 7 and ordinarily within the range approximately 8–10 for the most satisfactory copolymerization and for best stability of the product at elevated temperatures. This pH is established by introducing an alkali as, for instance, sodium or potassium hydroxide in amount, if any, required to raise the pH to the level stated and adding the alkali in increments as may be required to maintain the pH. The alkali protects the metal in the stabilizer compound from liberation by acid of the reacting system.

*Process of Making Stabilizer*

The copolymerizable stabilizer is purchased or is made by any standard process. To make a homolog or analog of a stabilizer not fully described heretofore, there is substituted the desired metal atom, alkyl group, or unsaturated acid in the materials used in making, by known process, the close homolog or analog.

To make the phosphite ester of the beta carbon unsaturated alcohols, I use the conventional process of making alkyl or aryl phosphites except that I substitute all or part of the alkyl or aryl group in the material supplying it to the reaction by vinyl, allyl, or cinnamyl.

The invention will be further illustrated by detailed description in connection with the following specific examples. In these examples and elsewhere, proportions are expressed as parts by weight unless specifically stated to the contrary.

EXAMPLE 1

A charge was made as follows:

| Component: | Parts |
|---|---|
| Water | 70 |
| Monomer (85 vinyl chloride, 15 vinyl acetate) | 30 |
| Tributyl tin acrylate | 0.3 |
| Ammonium persulfate | 0.09 |
| Concentrated ammonium solution (28%) | 0.50 |

The above charge was maintained under autogenous pressure (120 p.s.i. at the start), at 66° C., and agitated for 4 hours. A latex-like dispersion was formed which was filtered and dried. The product was a fine powder and the yield was 100% of theory.

A 25% solution of the product in methyl ethyl ketone had a Brookfield viscosity of 300–500 cps. The solution was clear.

The heat stability of the said powder was superior to the control sample in which the stabilizer was not copolymerized. The stabilizer was non-migratory, non-volatile, and non-extractable from the vinyl monomer used.

The particle size of the product can be adjusted by coagulating the said latex with aqueous sodium acetate or ammonium acetate, without adversely affecting the high temperature heat stability of the product.

EXAMPLE 2

The procedure and composition of Example 1 are followed except that the tin compound there used is replaced by an equal weight of any one of the beta carbon unsaturated acid esters that contains no metal and is disclosed earlier herein and illustrated by allyl alkyl, allyl aryl and triallyl phosphite.

EXAMPLE 3

This example illustrates a process of making a copolymer of the metal stabilizer with the chlorine-containing monomer when the metal stabilizer is insoluble in the latter. In this process the said monomer is copolymerized with the unsaturated acid to be represented in the stabilizer and the resulting copolymer then reacted with the metal that is to appear in the finished product.

The copolymerization is effected in manner and with added materials that are conventional in making polymers of ethylenic bond polymerizable monomers, as with any one of the initiators shown herein and under the conditions stated. Then the copolymer is reacted with an oxide of the stabilizing metal, as in aqueous emulsion or by suspension of the oxide in a dispersion or solution of the copolymer in benzene, petroleum ether, or the like, suitably in contact with a trace of water.

For instance, 100 parts of vinyl chloride are mixed with 300 of water and 5 of methacrylic acid. When a uniform dispersion has been formed, 0.5 part of lauroyl peroxide is added in small portions, the whole being well stirred meanwhile and maintained at about 60° C., until the addition is complete and the pressure in the system falls to a substantially constant level.

The resulting copolymer at a pH established below 7 is then reacted with an alkyl metal oxide, the acid component and oxide reacting according to the Equations 1, 2, or 3 above, with the acid there used replaced by an equivalent weight, as an acid, of the copolymer of the vinyl chloride and methacrylic acid.

Products made as described are useful as plastics in films and for other purposes for which stabilized resins of the chlorine-containing class are used. The products having therein a copolymerized metal of fungicidal properties are useful as fungicides, particularly when the proportion of metal in the stabilizer component is high.

In use as a fungicide, the copolymer is applied to a cloth or the like in the form of a solution as in toluene or xylene. So applied, the volatile solvent of the solution evaporates and the copolymerized metal component becomes anchored in the cloth.

It is to be understood that it is intended to cover all changes and modifications of the examples of the invention herein chosen for the purpose of illustration which do not constitute departures from the spirit and scope of the invention.

I claim:

1. In making a copolymer of vinyl chloride and stabilizing the copolymer against light and heat decomposition, the process which comprises forming a mixture of the said monomer exclusively in monomeric form, a comonomer in unpolymerized condition and in the proportion of 0.3%–5% of the weight of the vinyl chloride, and an initiator of polymerization of vinyl chloride and maintaining the said mixture at a temperature of about 20°–120° C. until copolymerization of the vinyl chloride and the comonomer is effected, the comonomer being a trihydrocarbon phosphite ester wherein at least one of the hydrocarbon groups is allyl.

2. The process of claim 1, the said monomer being triallyl phosphite.

3. A stabilized resin comprising a copolymer of 100 parts by weight of vinyl chloride monomer and about 0.3–5 parts of a comonomer, the comonomer being a trihydrocarbon phosphite ester wherein at least one of the hydrocarbon groups is allyl.

References Cited in the file of this patent

UNITED STATES PATENTS

| | | |
|---|---|---|
| 2,160,942 | Britton | June 6, 1939 |
| 2,202,846 | Garvey | June 4, 1940 |
| 2,253,128 | Langkammerer | Aug. 19, 1941 |
| 2,273,891 | Pollack et al. | Feb. 24, 1942 |
| 2,318,959 | Muskat | May 11, 1943 |
| 2,439,214 | Lindsey | Apr. 6, 1948 |
| 2,456,231 | Wiley | Dec. 14, 1948 |
| 2,557,805 | Upson | June 19, 1951 |
| 2,559,854 | Dickey et al. | July 10, 1951 |
| 2,636,027 | Coover | Apr. 21, 1953 |